United States Patent Office 2,859,633
Patented Nov. 11, 1958

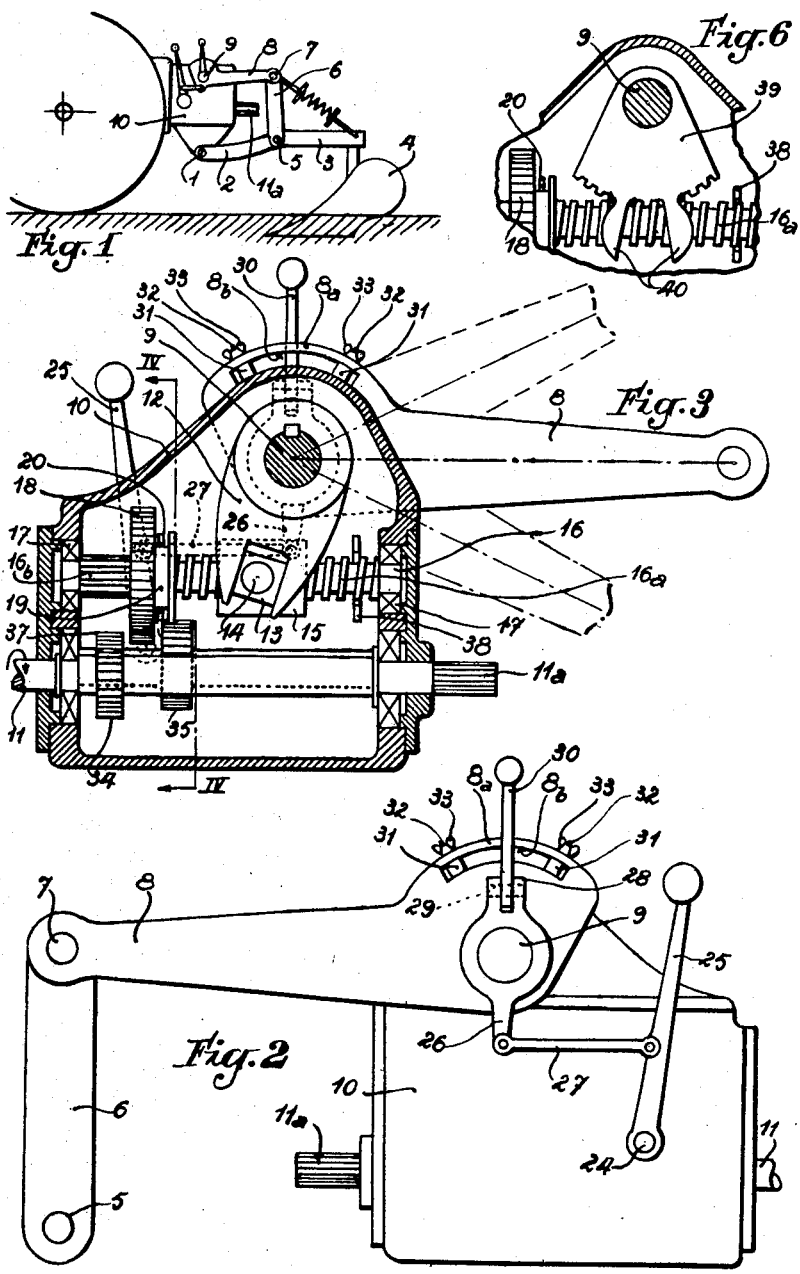

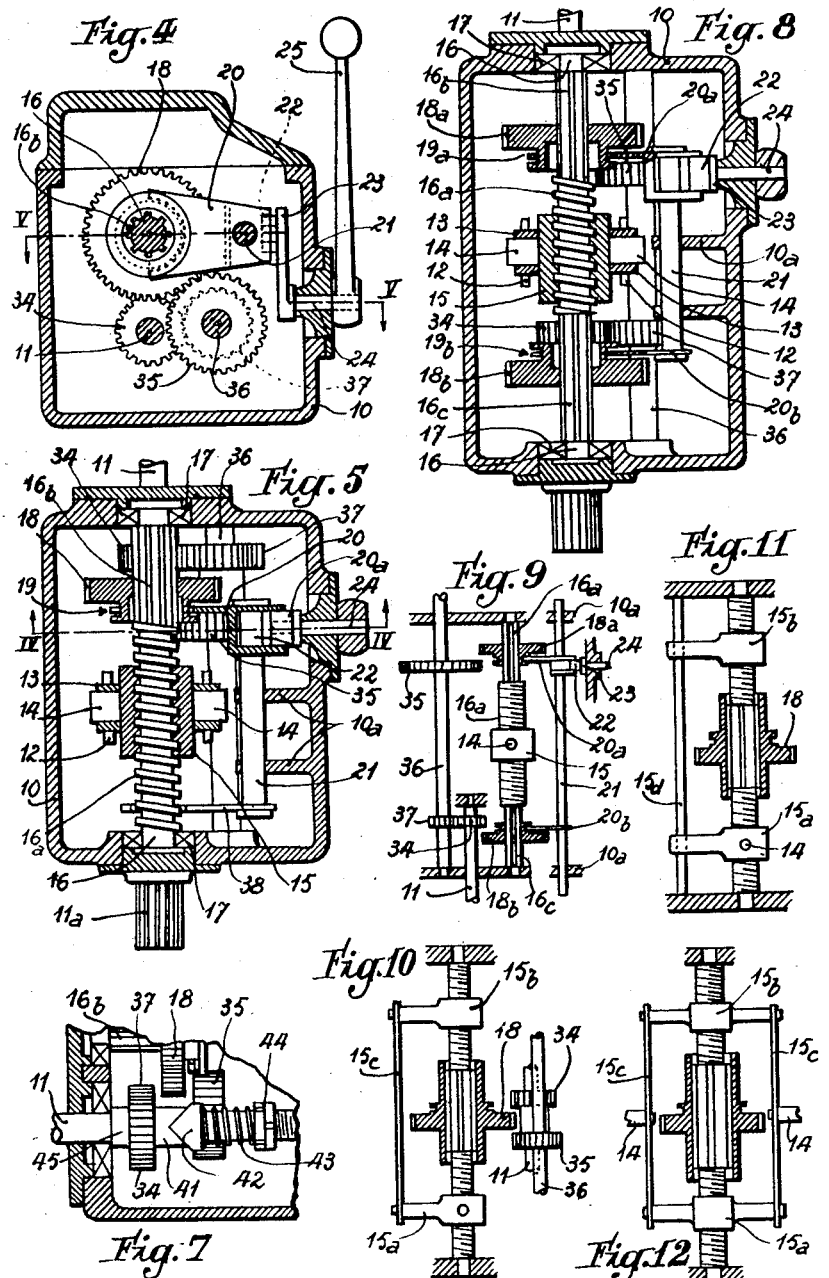

2,859,633

LIFTING MECHANISMS FOR USE WITH AGRICULTURAL TRACTORS

Albert Patissier, Rhone, France

Application June 17, 1954, Serial No. 437,441

Claims priority, application France June 19, 1953

16 Claims. (Cl. 74—319)

This invention relates to lifting mechanisms for agricultural implements supported by a tractor of the kind wherein an oscillatable lifting arm carried by the tractor is driven by a threaded member engaged by a rotating screw adapted to be connected with the power take off shaft of the tractor for being rotated in one direction or in the other, abutments being provided for automatically disconnecting the screw at both ends of the stroke of the threaded member.

A first object of this invention is to enable the driver to adjust easily at will the ends of the stroke of the lifting arm without disadjusting the abutments corresponding to the maximum stroke permissible.

Another object of this invention is to provide complete safety of the mechanism concerning disconnection of the rotatable screw at the ends of the maximum stroke permissible.

According to a further object of this invention the mechanism comprises a pair of disconnecting abutments disposed within the casing to limit the stroke of the threaded member with respect to the rotatable screw to the maximum permissible, and a pair of adjustable abutments disposed outside the said casing to ensure for the lifting arm a smaller stroke than the maximum stroke as determined by the inner abutments. Under such conditions the inner abutments form a safety device limiting in any case the stroke of the lifting arm and avoiding any damage to the gearing, while the outer adjustable abutments enable the driver to adjust at will the operating stroke of the said lever.

The outer adjustable abutments preferably actuate a disengageable member, whereby the driver may eventually increase the stroke of the lifting arm when required, without having to disadjust the outer abutments.

According to another feature of the invention, the power transmission between the power take-off shaft and the rotating screw comprises axially disengageable transmission members adapted to cause rotation of said screw in one and in the other direction and the inner abutments are formed by the disengageable transmission members themselves, the threaded member actuating directly the said transmission members at the ends of its stroke. With such an arrangement any intermediate gearing, such as rod, lever or the like is avoided between the threaded member and the clutch parts, whereby any risk of defective operation of such intermediate gearing is eliminated.

In an embodiment of this invention the threaded member is in the form of a nut carried by the rotatable screw, the said nut being engaged by a forked member keyed on the shaft of the lifting arm, while the reversing gear comprises one or two sliding gears directly actuated by the said nut at the ends of its stroke on the said screw, such sliding gears thus forming themselves the first pair of limiting abutments. The adjustable abutments are carried by the lifting arm itself and they cooperate with a control lever connected with the sliding gears, the said control lever being swingable from its operative position.

In the annexed drawings:

Fig. 1 is a general diagrammatical view showing the rear of a tractor provided with a lifting mechanism according to the invention, associated with a plough.

Fig. 2 is a side view of the said lifting mechanism supposedly removed from the tractor.

Fig. 3 is a longitudinal section through the mechanism shown in Fig. 2.

Fig. 4 is a transverse section thereof, taken along line IV—IV of Fig. 3.

Fig. 5 is a horizontal section thereof taken along line V—V of Fig. 4.

Fig. 6 is a fragmentary longitudinal section of a modification embodying a threaded member in the form of a sector.

Fig. 7 illustrates another modification adapted for tractors having a power take-off shaft rotatable in either direction.

Fig. 8 is a section showing embodiment comprising two sliding gears disposed on each side of a movable nut.

Fig. 9 is a diagrammatic view illustrating the essential parts shown in the mechanism of Fig. 8 disposed in one and the same plane for a bettter understanding of the arrangement and of its operation.

Figs. 10 to 12 diagrammatically show other modifications of a lifting mechanism according to the invention.

The tractor illustrated in Fig. 1 has at the rear a transverse shaft 1 to which are attached longitudinal drawbars 2 articulated at the front end of the bar 3 of a plough 4. To the front end of the bar 3 there is also articulated at 5 a substantially vertical link 6, the other end of which is articulated at 7 to a lifting arm 8 keyed on a transverse shaft 9 carried by a casing 10 secured at the rear of the tractor. The power take-off shaft 11 (Figs. 2 and 3) of the tractor passes through the casing 10 and its splined end 11a projects at the rear thereof.

The transverse shaft 9 carries within casing 10 a forked member 12 (Fig. 3) the flat arms of which are themselves cut in the form of forks and slidably engage rectangular blocks 13 (Fig. 5) loose on two opposed studs 14 carried by a cylindrical member 15. The cylindrical member 15 is threaded and it forms a nut on a horizontal screw 16a (Figs. 3 and 5) cut on a portion of the length of a longitudinal shaft 16 carried by bearings 17 within the casing 10. Shaft 16 has a splined end 16b on which is slidably mounted a gear 18 having a lateral shoulder provided with a groove 19. This groove 19 is engaged by a fork 20 (Figs. 4 and 5) integral with a rod 21 longitudinally slidable in lugs 10a of the casing 10. The portion of this fork 20 secured to rod 21 is U-shaped, as indicated at 20a in Fig. 5, and this U is engaged by a roller 22 (Fig. 4) mounted at the end of an arm 23 keyed on a shaft 24 which passes through the casing 10 and carries an outer control lever 25.

The transverse shaft 9 extends beyond arm 8 and on this extension there is loosely mounted a lever 26 (Fig. 2) connected with the control lever 25 by a link 27. Lever 25 is integral with a stirrup 28 carrying a transverse pin 29 on which is oscillatable a lever 30 which is elastically maintained by a spring (not shown) against a sector-shaped lateral extension 8a of the arm 8. This extension 8a has an arcuate opening 8b in which are slidably disposed two longitudinal bars 31. Each bar 31 has a cylindrical tail portion 32 which passes through a longitudinal slot provided in the portion of sector 8a which forms the edge of the opening 8b. A wing-nut 33 is screwed on each tail 32 to secure the corresponding bar 31 in position. Bars 31 project laterally to form abutments cooperating with the lever 30.

The slidable gear 18 may selectively cooperate with two gears 34 and 35 (Figs. 4 and 5). Gear 34 is keyed on the power take-off shaft 11 while gear 35 is keyed on a lateral shaft 36 rotatable within casing 10, the said shaft carrying another gear 37 of smaller diameter which meshes with the above mentioned gear 34. Gears 34 and 35 thus rotate in opposed direction and the sliding gear 18 may be driven in one direction or in the other, the intermediate or disengaged position corresponding to stoppage of the shaft 16.

The arrangement is such that when the sliding gear 18 is displaced towards the right of Fig. 3 the resulting rotation of screw 16a displaces the cylindrical member nut 15 towards the left, and vice versa. Moreover the lateral extension of the sliding gear 18 and the left end of the nut 15 are so arranged that they may project beyond the transverse plane separating the screw portion 16a and the splined portion 16b whereby the nut may push the sliding gear 18 and return the latter to the disengaged position.

The slidable rod 21 is integral with a plate 38 (Figs. 3 and 5) adapted to be driven by the cylindrical member or nut 15, when the latter reaches the right end of its stroke in Fig. 3.

The mechanism described operates as follows:

The screw portion 16a is of sufficiently small pitch to form a non-reversible system with the cylindrical member or nut 15. Thus when the sliding gear 18 is disengaged, the lifting arm 8 remains fixed irrespective of the force which may be applied to the said arm. It results therefrom that when this arm has been raised and has raised the plough 4 above the ground, the plough remains raised without any tendency to move downward. By actuating the control lever 25 the driver may cause the screw 16a to rotate in one direction or in the other whereby the plough is positively raised or lowered. The raising or lowering speed is only dependent on the speed of the power take-off shaft 11, the weight of the plough having practically no influence. Any risk of sudden fall of the plough owing to a careless operation is thus wholly eliminated.

When during the angular motion of the lifting arm 8 in any direction a bar 31 abuts against the lever 30, it moves the latter. By considering Fig. 3 it will easily be appreciated that the direction of this displacement is such that the sliding gear 18 is returned to the disengaged position through the link 27, the control lever 25, the shaft 24, the roller 22 and the fork 20, whereby the vertical movement of the plough is stopped. It is thus possible to adjust at will the end positions of the vertical movement of the plough by means of bars 31. The operation is wholly automatic. When, for any reason, it is desirable to raise or to lower the plough beyond the limits determined by bars 31, the driver only has to swing lever 30 laterally whereby the latter is no more actuated by bars 31, without having to disadjust the latter. Even in such a case any damage remains quite impossible since the movement of the cylindrical member or nut 15 remains limited, as above explained, by the sliding gear 18 and by the plate 38.

In the modification of Fig. 6 the cylindrical member or nut 15 and the forked member 12 are replaced by a toothed sector 39 directly keyed on the transverse shaft 9 and meshing with the screw 16a. Section 39 is provided with laterally projecting lugs 40 which are adapted to abut on one side against the sliding gear 18 and on the other side against the plate 38. It will be appreciated that the operation remains quite unchanged, disconnection of the screw being ensured by the lugs 40 at both ends of the maximum permissible stroke of sector 39.

It has been hitherto assumed that the power take-off shaft was always rotating in the same direction irrespective of the position of the change speed lever of the tractor. But it sometimes occurs that the power take-off shaft rotates in the reverse direction when the tractor is running backwards. In such a case if the lifting mechanism is operated when the tractor is running backwards the cylindrical member or nut 15 becomes ineffective since it operates in the reverse direction and tends to engage the sliding gear.

This may be avoided in many ways.

A first method consists in mounting gear 34 loose on the power take-off shaft 11 and in providing a free-wheel device between said gear and said shaft, whereby the gear is only driven when the shaft rotates in the normal direction.

Another method consists in disposing a torque limiting coupling between gear 34 and the power take-off shaft 11, as indicated in Fig. 7. In the embodiment illustrated gear 34 is loose on shaft 11, but it is formed with lateral triangular teeth 41 which cooperate with a similarly toothed sleeve 42 slidably keyed on shaft 11 and pressed into engagement by a spring 43 seating against an adjustable ring 44. Gear 34 bears against another ring 45. In normal operation gear 34 is driven by sleeve 42 owing to the pressure provided by spring 43. But if the mechanism is operated when the tractor is running backwards, as soon as the cylindrical member or nut 15 has reached the end of its stroke, it becomes jammed and the sleeve 42 moves longitudinally against the action of spring 43, whereby any breakage of parts is avoided. It will be noted that the slope of the teeth in mutual engagement may be non-symmetrical, whereby the device may transmit a high torque in normal direction and on the contrary slide easily when the shaft 11 is rotated backwards.

In the embodiment above described the safety of the automatic disconnection of the rotating screw is not quite the same for both directions of rotation of the screw. Considering Fig. 5, when the nut 15 moves towards the top it directly pushes the sliding gear 18, thus ensuring complete safety. On the contrary when nut 15 moves towards the bottom, it acts on plate 38 which effects the disconnection through rods 21 and 20, in such a manner that if one of these parts is damaged the disconnection may not be effected.

This is avoided in the embodiment of the Figs. 8 and 9. In this embodiment shaft 16 has two splined portions 16b and 16c, disposed each side of screw 16a. Gears 34 and 35 are also disposed on each side of screw 16a and they cooperate with two sliding gears 18a and 18b respectively disposed on the splined portions 16b and 16c, the first one cooperating with gear 35 and the second with gear 34. Each sliding gear 18a, 18b has a lateral extension provided with a groove respectively 19a and 19b, cooperating with a fork, respectively 20a and 20b, these forks being secured at the opposed ends of the slidable rod 21.

In the diagrammatic view of Fig. 9 it has been supposed that the three shafts 11, 16 and 36 were in one and the same plane. Forks 20a and 20b are so arranged that the distance apart of the sliding gears 18a and 18b is greater than the distance apart of gears 34 and 35. As in the case of Figs. 1 to 5, these gears 34 and 35 are rotated in opposed directions by the power take-off shaft 11.

If by means of shaft 24 (Fig. 8) rod 21 is displaced to the bottom, the sliding gear 18b engages gear 34. Shaft 16 is thus rotated and the cylindrical member or nut 15 moves to the bottom on screw 16a. If rod 21 had been displaced towards the top, the sliding gear 18a would have engaged gear 35 and the cylindrical member or nut 15 would have moved to the top. At the end of its stroke in any direction, the cylindrical member or nut 15 abuts directly against the sliding gear 18a or 18b which is in engagement and it thus positively ensures disengagement of this gear either during the raising or during the lowering of the plough or like agricultural implement. Full safety is thus obtained in both cases since the driving gear is always positively disengaged even if, for instance, forks 20a and 20b are broken or bent.

It will be appreciated that when nut 15 has thus disengaged one of the sliding gears it prevents the driver from re-engaging this same gear.

In the embodiment diagrammatically illustrated in Fig. 10 the rotatable screw is divided into two successive portions and there is provided a single central sliding gear 18 disposed between these portions. The nut also comprises two elements 15a and 15b, each element being carried by one of the portions of the screw. The nut element 15a carries the lateral studs 14 by means of which it is connected with the lifting arm, while the nut element 15b is merely connected with the former by a rod 15c. It will be appreciated that the operation remains the same as in the case of Fig. 9.

In the modification of Fig. 11 the nut element 15b is prevented from rotating by a guiding rod 15d which slidably engages a lug formed on the said nut element. It has been supposed on this figure that the nut element 15a which actuates the lifting arm was also provided with a lateral lug slidable on rod 15d, although this is by no means indispensable, since nut element 15a is prevented from rotating by the forked member such as 12 (Fig. 3).

In the modification of Fig. 12 the two nut elements 15a and 15b are rigidly connected with each other by two longitudinal rods 15c and the studs 14 adapted to actuate the forked member such as 12 (Fig. 3) are carried by the said rods.

What I claim is:

1. A lifting mechanism for agricultural tractors having a power take-off shaft, comprising a forward and reverse gear driven by said shaft; a rotatable screw adapted to be driven in either direction by said forward and reverse gear; a movable threaded member in engagement with said rotatable screw adapted to be driven thereby; a lifting gear driven by said threaded member; a pair of abutments respectively disposed at the ends of the maximum permissible stroke of said threaded member to be actuated thereby, each of said abutments, when so actuated, actuating in turn said forward and reverse gear to disconnect said rotatable screw therefrom; a second pair of abutments adapted to be actuated by said lifting gear respectively for either direction of movement thereof, said second pair of abutments being adjustable with respect to the stroke of said lifting gear to be actuated thereby at any desired point in the stroke thereof for each direction of movement of the lifting gear; and means connecting said second pair of abutments with said forward and reverse gear to disconnect said rotatable screw therefrom when any one of said second pair of abutments is actuated by said lifting gear during the raising or lowering movement thereof.

2. In a lifting mechanism as claimed in claim 1, means to render said second pair of abutments ineffective without disadjusting same.

3. In a lifting mechanism as claimed in claim 1, said lifting gear comprising an oscillatable arm, and said second pair of abutments being carried by said arm and being adjustable thereon angularly with respect to the axis of oscillation of said arm.

4. A lifting mechanism for agricultural tractors having a power take-off shaft, comprising a forward and reverse gear driven by said shaft; a rotatable screw adapted to be driven in either direction by said forward and reverse gear; a movable threaded member in engagement with said rotatable screw adapted to be driven thereby; a lifting gear including an oscillable lifting arm driven by said threaded member; a pair of abutments respectively disposed at the ends of the maximum permissible stroke of said threaded member to be actuated thereby, each of said abutments, when so actuated, actuating in turn said forward and reverse gear to disconnect said rotatable screw therefrom; a second pair of abutments carried by said lifting arm and adjustable thereon angularly with respect to the axis of oscillation of said arm; a control lever adapted to be actuated by said second pair of abutments for either direction of rotation of said lifting arm; and means to connect said control lever with said forward and reverse gear to cause disconnection of said rotatable screw from said forward and reverse gear when said control lever is actuated by either of said second pair of abutments.

5. In a lifting mechanism as claimed in claim 4, said control lever being swingable about an axis perpendicular to the axis of said lifting arm to render said last-named abutments ineffective.

6. In a lifting mechanism as claimed in claim 4, said lifting arm being integral with a sector having an arcuate opening concentric with said lifting arm; said second pair of abutments being adjustable in said opening and projecting laterally therefrom; and said control lever being co-axial with said lifting arm.

7. A lifting mechanism for agricultural tractors having a power take-off shaft, comprising a rotatable shaft having a screw thereon; a sliding gear disposed on said rotatable shaft next to one end of said screw; a pair of gears with which said sliding gear may be selectively engaged; means to connect the gears of said pair of gears with said power take-off shaft to cause said gears to rotate in opposed directions; a threaded member in engagement with said screw to be driven thereby, said member being adapted to push said sliding gear at the end of its stroke towards said sliding gear for one direction of rotation of said screw to disconnect the latter from said power take-off shaft; an abutment at the end of said screw opposed to said sliding gear; said abutment being adapted to cooperate with said threaded member at the end of its stroke towards the same for the other direction of rotation of said screw; means to connect said abutment with said sliding gear to cause disconnection of said screw from said power take-off shaft when said abutment is actuated; and a lifting gear driven by said threaded member.

8. In a lifting mechanism as claimed in claim 7, a second pair of abutments so disposed as to be actuated by said lifting gear for either direction of movement thereof and to cause disconnection of said screw from said power take-off shaft for either direction of movement of said lifting gear, said second pair of abutments being adjustable with respect to the stroke of said lifting gear to permit of adjusting the ends of the stroke of said lifting gear independently of the action of said threaded member on said sliding gear or on said first-named abutment.

9. In a lifting mechanism as claimed in claim 7, a second pair of abutments so disposed as to be actuated by said lifting gear for either direction of movement thereof and to cause disconnection of said screw from said power take-off shaft for either direction of movement of said lifting gear, said second pair of abutments being adjustable with respect to the stroke of said lifting gear to permit of adjusting the ends of the stroke of said lifting gear independently of the action of said threaded member on said sliding gear or on said first-named abutment, and said lifting mechanism comprising means to render said second pair of abutments ineffective without disadjusting same.

10. A lifting mechanism for agricultural tractors having a power take-off shaft comprising a rotatable screw; a threaded member in engagement with said rotatable screw to be driven thereby; a lifting gear driven by said threaded member; a forward and reverse gear driven by said power take-off shaft to rotate said screw in either direction, said gear embodying two axially disengageable transmission members each at one end of said screw and each adapted to be brought to the engaged position for rotating said screw respectively in one direction and in the other by being displaced axially of said screw towards the central portion thereof, and said transmission members being adapted to be directly brought back to the disengaged position by said threaded member at the the end of its stroke in either direction under the action of said screw.

11. In a lifting mechanism as claimed in claim 10, means to connect said axially disengageable transmission members with each other to ensure their longitudinal displacement in unison.

12. In a lifting mechanism as claimed in claim 10, a second pair of abutments so disposed as to be actuated by said lifting gear for either direction of movement thereof and to cause disconnection of said axially disengageable transmission members and stoppage of said screw, said second pair of abutments being adjustable with respect to the stroke of said lifting gear to permit of adjusting the ends of the stroke of said lifting gear independently of the action of said threaded member on said axially disengageable transmission members.

13. A lifting mechanism for agricultural tractors having a power take-off shaft, comprising a rotatable shaft having a screw formed thereon; a threaded member in engagement with said screw to be driven thereby; a lifting gear driven by said threaded member; a pair of gears each being disposed in the vicinity of one end of said screw; means to connect said gears with said power take-off shaft to cause said gears to rotate in opposed directions; a pair of sliding gears on the ends of said rotatable shaft each side of said screw to respectively mesh with said first-named gears, each of said sliding gears being adapted to be directly brought back to the disengaged position by said threaded member at the end of its stroke in one direction under the action of said screw, and means connecting said sliding gears to ensure their longitudinal displacement in unison to cause successive and non-simultaneous engagement of either one of said sliding gears with one of said first-named gears.

14. In a lifting mechanism as claimed in claim 13, a second pair of abutments so disposed as to be actuated by said lifting gear for either direction of movement thereof and to cause return of said sliding gears to the disengaged position, said second pair of abutments being adjustable with respect to the stroke of said lifting gear to permit of adjusting the ends of the stroke of said lifting gear independently of the action of said threaded member on said sliding gears.

15. A lifting mechanism for agricultural tractors having a power take-off shaft, comprising a rotatable shaft having two screw portions formed thereon at a distance from each other with the respective pitches in the same direction; a pair of threaded members each in engagement with one of said screw portions to be driven thereby; a lifting gear driven by one at least of said threaded members; a pair of gears disposed in the portion of said rotatable shaft comprised between said screw portions; means to connect said gears with said power take-off shaft to cause said gears to rotate in opposed directions; and a sliding gear on said rotatable shaft between said screw portions, adapted to cooperate selectively with one and the other of said first-named gears, said sliding gear being adapted to be directly brought back to the disengaged position by each of said threaded members at the end of its stroke towards said sliding gear.

16. In a lifting mechanism as claimed in claim 15, a pair of abutments so disposed as to be actuated by said lifting gear for either direction of movement thereof and to cause return of said sliding gear to the disengaged position, said abutments being adjustable with respect to the stroke of the lifting gear to permit of adjusting the ends of the stroke of said lifting gear independently of the action of said threaded members on said sliding gear.

References Cited in the file of this patent
UNITED STATES PATENTS

| | | |
|---|---|---|
| 854,056 | Richards | May 21, 1907 |
| 2,155,177 | Woodruff et al. | Apr. 18, 1939 |